Patented Feb. 24, 1953

2,629,696

UNITED STATES PATENT OFFICE 2,629,696

ESSENTIALLY NON-AQUEOUS ACID EMULSION CLEANING COMPOSITION

Sidney R. Dodd, West Caldwell, N. J., and Edward J. Ainsley, Merrick, N. Y., assignors to Oakite Products, Inc., New York, N. Y., a corporation No Drawing. Application May 16, 1949,
Serial No. 93,637

4 Claims. (Cl. 252—136)

The present invention relates to novel stable water dispersible essentially non-aqueous emulsions containing phosphoric acid and a water insoluble organic solvent and more particularly to such emulsions which also contain a water soluble organic acid which is solid at room temperatures.

It is an object of the invention to provide a novel water dispersible phosphoric acid emulsion cleaner for cleaning metal surfaces which is in the form of a gel.

It is a further object to provide a novel water dispersible phosphoric acid emulsion containing a water insoluble organic solvent which is stable when subjected to extremes in temperatures and when shipped.

It is a still further object of the invention to provide a novel phosphoric acid emulsion cleaner which may be shipped in ordinary steel containers without appreciable attack upon the steel in such containers.

Still another object of the invention is to provide a novel water dispersible stable phosphoric acid emulsion which contains a solid water soluble organic acid dispersed therein.

In accordance with the invention it has been discovered that stable essentially non-aqueous emulsions of phosphoric acid and water insoluble organic solvents in the form of a gel may be produced with the aid of non-ionic emulsifying agents, that is, emulsifying agents which do not possess polar groups. Emulsifying agents which are either cationic or anionic will not produce gels with phosphoric acid. Suitable types of non-ionic emulsifying agents which can be employed in accordance with the invention are the alkylated aryl polyether alcohols such as Triton X-45 and Triton X-100, dimers of the alkylated aryl polyether alcohols such as Triton X-155, polymerized ethylene oxide condensation products such as Igepal C. A. and Solvadine E. O. (a phenolic ethylene oxide condensate) and esters such as propylene glycol (600) monoleate, glyceryl mono-ricinoleate and polyethylene sorbitan monostearate. The ester type of non-ionic emulsifying agents while producing satisfactory gels is less preferred in view of the tendency of the esters to hydrolyse.

The organic solvents which may be used in such essentially non-aqueous emulsions are hydrocarbons such as kerosene, xylene and the like, water insoluble ketones and aldehydes, namely, those having molecular weights above pentanone and valeraldehyde such as cyclohexanone, trimethyl nonanone and benzaldehyde, water insoluble ethers such as amyl ether and water insoluble organic acids such as oleic acid. The hydrocarbon organic solvents are preferred as they are more easily available and also tend to give thicker gels.

The proportions of phosphoric acid to organic solvent may be varied over wide ranges and depend to some extent upon the amount of emulsifying agent present. However, it has been found that the gels become thicker as the proportion of organic solvent is increased until a limit is reached when the thick grease-like emulsion will not absorb further quantities of the solvent. The lower limit of the proportion of organic solvent to the phosphoric acid is determined by the amount which no longer causes satisfactory gel formation for as the proportion of phosphoric acid is increased the gel becomes thinner. For example, it has been found that in an emulsion containing 1% of a typical non-ionic emulsifying agent, stable emulsions may be obtained with proportions of kerosene to phosphoric acid up to 9 to 1. On the other hand proportions of phosphoric acid to kerosene greater than about 2 or 3 to 1 produce gels which are too thin to be useful.

The quantity of emulsifying agent necessary to produce stable gels depends upon the proportions of phosphoric acid and organic solvent. If insufficient quantities are used the gels produced therewith tend to decompose upon standing. For example, to prepare a stable gel containing 5 parts of kerosene to 3 parts of 100% phosphoric acid it was found that as little as 0.2% of a typical non-ionic emulsifying agent (Neutronyx 560) gave a completely stable heavy gel. If, however, the quantity of emulsifying agent is reduced to 0.1% a gel may be produced but it will begin to decompose after ten days or so.

The amount of water in the phosphoric acid gels in accordance with the invention is preferably kept down to a minimum and should not exceed 5%, as emulsions containing substantial quantities of water will tend to break down when subjected to temperature extremes. While gels in accordance with the invention can be produced with phosphoric acid of a concentration as low as 85% the quantity of water introduced by such acid or by the other ingredients should not exceed the above specified 5%. The denotation in the specification and claims that the gels in accordance with the invention are essentially water free is intended to signify that the water content of such gels does not exceed 5%. When 100% phosphoric acid is employed, in preparing the gel in accordance with the invention, it is found preferable to add a small quantity of water which is just sufficient to dissolve the non-ionic emulsifying agent employed to simplify the production of the gel. The quantity of water used for this purpose may be as low as 0.05%.

It has furthermore been discovered in accordance with the invention that substantial quantities of solid water soluble organic acids may be incorporated in the essentially water free phosphoric acid organic solvent gels without affecting the stability of such gel if the organic acid is first dissolved in a polyhydroxy compound before being incorporated in the gel. If any ester formation should take place between the organic acid and the polyhydroxy compound, such esters still contain the organic acid in available form as the esters hydrolyse when the acid emulsion is dispersed in water. In the absence of such polyhydroxy compounds it was found that the organic acid tends to crystallize and settle out and that it also tends to cause splitting of the emulsion upon standing.

Typical solid water soluble organic acids which can be incorporated in the emulsions in accordance with the invention are oxalic, citric, tartaric, lactic and levulinic acids. Examples of polyhydroxy compounds which can be employed for the introduction of such acids into the emulsions are polyethylene glycols, ethylene glycol or its homologues, glycerine, mannitol, dextrose or other sugars, and polyhydric phenols such as hydroquinone.

The addition of a water soluble organic acid to the phosphoric acid gel cleaning composition in accordance with the invention is for the purpose of improving the cleaning and particularly the rust removal properties of such composition when used to clean metal surfaces. The quantity of organic acid incorporated in the phosphoric acid gel depends upon the purpose for which the gel is to be used. It has been found, for example, that gels in accordance with the invention containing around 10% of an organic acid are admirably suited for use in cleaning metal surfaces such as airplanes and railroad equipment. The quantity of polyhydroxy compound used should be sufficient to prevent separation of the organic acid in the gel and to prevent break down of the gel. It has been found that at least one part of a polyhydroxy compound should be employed for every three parts of organic acid.

While the rust removal effect of solid water soluble organic acids such as oxalic acid has been previously known, their introduction into an essentially water free emulsion in accordance with the invention presented problems in view of the fact of their normal insolubility in such emulsions as they contain insufficient water to effect solution of any appreciable amount the organic acids and if sufficient water were present in such emulsions they tend to break down.

As not all non-ionic emulsifying agents possess sufficient wetting action it is sometimes desirable to incorporate wetting agents in the gels in accordance with the invention to improve their cleaning action. All wetting agents which are stable under acid conditions and are compatible with the emulsifying agents employed are suitable. Highly sulfated fatty esters such as Tetranol 1638, the quaternary ammonium compounds of the form R—N(CH$_3$)$_3$Cl wherein R is a fatty acid chain containing between 12 and 18 carbon atoms such as Arquad C and alkylated aryl polyether alcohols such as Triton X-45 have been found suitable.

The following examples are given for the purpose of illustrating the present invention, but are not intended to be limiting on the scope thereof.

*Example 1*

A very viscous gel-like reddish emulsion which is completely uniform and stable is produced by heating 80 cc. of polyethylene glycol (200) to 180° F. and adding 100 grams of oxalic acid. The heating is continued until all of the oxalic acid is dissolved and then 160 cc. of 100% H$_3$PO$_4$ is added. Then 10 cc. of a wetting agent and 15 cc. of an alkylated aryl polyether alcohol followed by 2 cc. of water and 650 cc. of kerosene are added to the composition. The mixture is then stirred and a uniform gel-like emulsion is obtained.

*Example 2*

A viscous black gel-like emulsion with the following composition: 10% of oxalic acid, 10% of dextrose, 40% of 100% H$_3$PO$_4$, 37% kerosene, 0.25% of wetting agent is obtained by heating the oxalic acid and dextrose together at about 212° F. until the oxalic acid melts and forms a slushy liquid with the dextrose and incorporating the other ingredients in the same manner as in Example 1.

*Example 3*

A very viscous stable reddish emulsion of the following composition: Citric acid 10%, glycerine 10%, 100% H$_3$PO$_4$ 40%, kerosene 37%, H$_2$O 0.2%, glyceryl monoricinoleate 1.8%, wetting agent 1.0% is obtained by dissolving the citric acid in the glycerine and then adding the other ingredients in the manner specified in the previous examples.

*Example 4*

A viscous brownish stable emulsion composed of tartaric acid 10%, mannitol 6%, H$_2$O 4%, 100% H$_3$PO$_4$ 30%, kerosene 47%, polyoxyethylene sorbitan monostearate 2.0%, wetting agent 1.0% is obtained by heating the tartaric acid, mannitol and water until a viscous liquid is formed and adding the other ingredients in the manner specified in the previous examples.

*Example 5*

A water emulsifiable gel is produced by dissolving 10 parts of oxalic acid in 8 parts of polyethylene glycol then mixing in 60 parts of 100% H$_3$PO$_4$ and then adding 1.5 parts of a non-ionic emulsifying agent and 1 part of a wetting agent followed by 0.5 part of water and 19 parts of trimethylnonanone and stirring the mixture until uniform.

*Example 6*

A stable gel is obtained by adding 15 cc. of an alkylated aryl polyethylene alcohol dissolved in 2 cc. of water to 160 cc. of 100% H$_3$PO$_4$ and stirring in 650 cc. of kerosene.

The phosphoric acid organic solvent gels of the above examples are all very stable and may be shipped in ordinary steel containers without breaking down.

The gels may be used to clean metals by applying them to the metal surfaces in the essentially water free condition and rinsing them off with water or they may be first dispersed in water before application to the metal surfaces.

We claim:

1. A water dispersible stable acidic emulsion in the form of a gel comprising phosphoric acid, a water insoluble organic solvent emulsified with a non-ionic emulsifying agent, a water soluble organic acid which is normally solid at room temperature in an amount effective to improve rust removal by the composition and a quantity of a water soluble polyhydroxy organic compound free of acid radicals sufficient to prevent the water soluble organic acid from crystallizing out of the emulsion, said water soluble organic acid being soluble in said polyhydroxy compound to give a solution which is at least semi-liquid, said emulsion being essentially water free.

2. A water dispersible stable acidic emulsion in the form of a gel comprising phosphoric acid, a hydrocarbon organic solvent emulsified with a non-ionic emulsifying agent, a water soluble organic acid which is normally solid at room temperature in an amount effective to improve rust removal by the composition and a quantity of a water soluble polyhydroxy organic compound free of acid radicals sufficient to prevent the water soluble organic acid from crystallizing out of the emulsion, said water soluble organic acid being soluble in said polyhydroxy compound to give a solution which is at least semi-liquid, said emulsion being essentially water free.

3. A water dispersible stable acidic emulsion in the form of a gel comprising phosphoric acid, kerosene emulsified with a non-ionic emulsifying agent, a water soluble organic acid which is normally solid at room temperature in an amount effective to improve rust removal by the composition and a quantity of a water soluble polyhydroxy organic compound free of acid radicals sufficient to prevent the water soluble organic acid from crystallizing out of the emulsion, said water soluble organic acid being soluble in said polyhydroxy compound to give a solution which is at least semi-liquid, said emulsion being essentially water free.

4. A water dispersible stable acidic emulsion in the form of a gel comprising phosphoric acid, kerosene emulsified with a non-ionic emulsifying agent, oxalic acid in an amount effective to improve rust removal by the composition and a quantity of a water soluble polyhydroxy organic compound free of acid radicals sufficient to prevent the oxalic acid from crystallizing out of the emulsion, said water soluble organic acid being soluble in said polyhydroxy compound to give a solution which is at least semi-liquid, said emulsion being essentially water free.

SIDNEY R. DODD.
EDWARD J. AINSLEY.

REFERENCES CITED

The following references are of record in the file of this patent:

UNITED STATES PATENTS

| Number | Name | Date |
| --- | --- | --- |
| 1,011,203 | Jahn | Dec. 12, 1911 |
| 1,428,084 | Gravell | Sept. 5, 1922 |
| 1,516,064 | Schmidt | Nov. 18, 1924 |
| 1,968,304 | McKee et al. | July 31, 1934 |
| 2,186,017 | Geng | Jan. 9, 1940 |
| 2,199,712 | Neilson | May 7, 1940 |
| 2,473,614 | Snyder | June 21, 1949 |

FOREIGN PATENTS

| Number | Country | Date |
| --- | --- | --- |
| 532,816 | Great Britain | Jan. 31, 1941 |
| 571,976 | Great Britain | Sept. 18, 1945 |